(12) United States Patent
Chen et al.

(10) Patent No.: US 6,580,868 B2
(45) Date of Patent: Jun. 17, 2003

(54) HIGH-RESOLUTION VARIABLE OPTICAL ATTENUATOR WITH MECHANICAL ADJUSTMENT

(75) Inventors: Jian J. Chen, Fremont, CA (US); Jianhua Wang, Milpitas, CA (US)

(73) Assignee: Optiwork, Inc., Fremont, CA (US)

( * ) Notice: Subject to any disclaimer, the term of this patent is extended or adjusted under 35 U.S.C. 154(b) by 158 days.

(21) Appl. No.: 09/812,358

(22) Filed: Mar. 19, 2001

(65) Prior Publication Data

US 2002/0181928 A1 Dec. 5, 2002

(51) Int. Cl.[7] .............................. G02B 6/00; G02B 26/00
(52) U.S. Cl. ........................ 385/140; 385/36; 359/227
(58) Field of Search ..................... 385/140, 36; 359/227

(56) References Cited

U.S. PATENT DOCUMENTS

| | | |
|---|---|---|
| 616,185 A | 12/1898 | Duis |
| 3,226,557 A * | 12/1965 | Goodman .................. 359/227 |
| 3,843,267 A | 10/1974 | Vital et al. |
| 4,971,414 A * | 11/1990 | Funato et al. ................ 385/14 |
| 5,087,122 A | 2/1992 | Ostrander et al. |
| 5,325,459 A | 6/1994 | Schmidt |
| 5,589,933 A | 12/1996 | Osgood et al. |
| 5,642,456 A | 6/1997 | Baker et al. |
| 5,900,983 A | 5/1999 | Ford et al. |
| 5,953,477 A * | 9/1999 | Wach et al. ................. 385/115 |
| 6,061,493 A | 5/2000 | Gilliland et al. |
| 6,144,794 A | 11/2000 | Mao et al. |
| 6,167,185 A | 12/2000 | Smiley et al. |
| 6,253,017 B1 * | 6/2001 | Hartley et al. .............. 385/140 |

* cited by examiner

*Primary Examiner*—Robert H. Kim
*Assistant Examiner*—Krystyna Suchecki
(74) *Attorney, Agent, or Firm*—Andrei D. Popovici

(57) ABSTRACT

A mechanically-adjustable variable optical attenuator includes a beam attenuator shaped as a concave quasi-cone. The beam attenuator has a sharp tip and a base, and can be rotationally symmetric with respect to a central axis extending between the tip and the base. The beam attenuator is positioned with its central axis perpendicular to the direction of the light beam to be attenuated. The extent of the beam attenuator obstructing the light beam is varied by moving the beam attenuator into and out of the light beam. The inwardly-curving, quasi-cone shape of the beam attenuator allows achieving a high resolution while limiting the beam attenuator size.

16 Claims, 7 Drawing Sheets

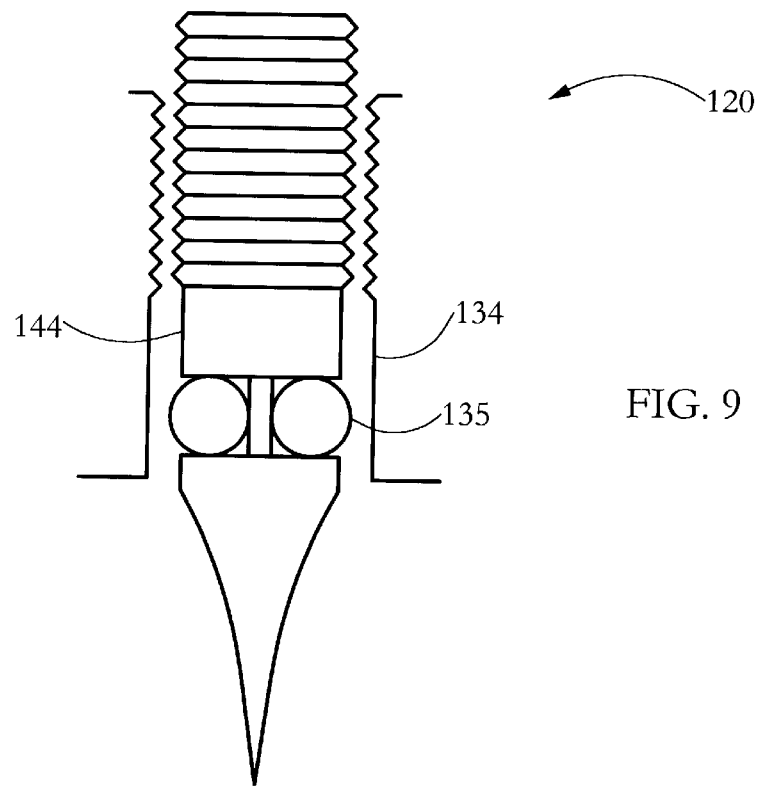
FIG. 9
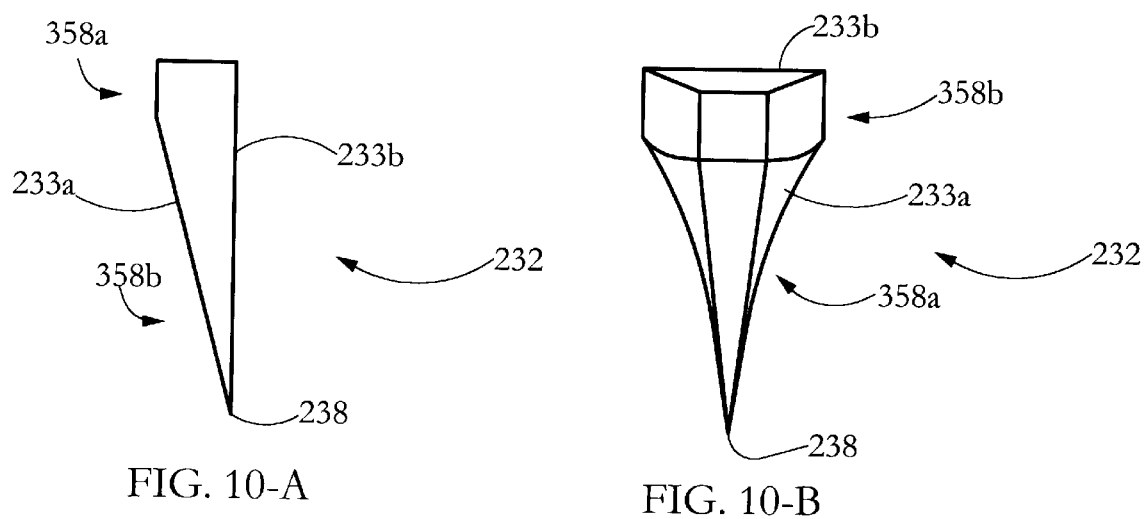
FIG. 10-A    FIG. 10-B

HIGH-RESOLUTION VARIABLE OPTICAL ATTENUATOR WITH MECHANICAL ADJUSTMENT

BACKGROUND

This invention relates to optical attenuators, in particular to variable optical attenuators with mechanical adjustment.

Variable optical attenuators are used to attenuate light beams in optical systems such as fiber optic communication systems. Controllably attenuating a light beam can be achieved by various methods, such as by passing the beam through a variable-attenuation (e.g. wedge-shaped) filter, radially bending a fiber loop to vary the optical loss within the loop, and partially blocking the beam by inserting a beam block into the light beam path.

Beam-blocking attenuators can act in a wavelength- and polarization-independent manner, and can have high reliability and repeatability. In addition, beam-blocking attenuators allow wide attenuation ranges, and can be relatively easy to manufacture. At the same time, beam-blocking attenuators can be relatively bulky. Moreover, achieving high resolutions with beam-blocking attenuators may require very fine (micron-level) mechanical control or tolerances.

In U.S. Pat. No. 6,167,185, Smiley et al. disclose an optical attenuator for attenuating a light beam while preserving the polarization of the light beam. The optical attenuator includes a beam attenuator for attenuating the light beam when disposed within the path of the light beam. The beam attenuator has a cross-section along a plane perpendicular to the direction of propagation of the light beam in the shape of a wedge. Smiley et al. teach that the disclosed attenuator preserves the polarization composition of the light beam over a large attenuation range. At the same time, the resolution of the attenuator described by Smiley et al. can be limited for a given beam attenuator size and precision of motion.

SUMMARY

The present invention provides a variable optical attenuator for attenuating a longitudinal light beam, comprising a generally transverse beam attenuator for attenuating the light beam, the beam attenuator having a proximal end, a distal tip, and a concave curved light-blocking surface extending between the proximal end and the distal tip, the blocking surface narrowing from the proximal region to the distal tip. A control device is coupled to the beam attenuator, for controlling a motion of the beam attenuator so as to vary an attenuation of the light beam caused by the beam attenuator. The optical attenuator has a variable resolution depending on an extent of the blocking surface blocking the light beam. The inwardly-curved boundary of the light-blocking surface allows improved attenuation resolutions relative to a conical light-blocking surface of the same overall size.

DESCRIPTION OF THE FIGURES

FIG. 9 shows a part of a variable optical attenuator according to an alternative embodiment of the present invention.

FIG. 10-A illustrates a longitudinal sectional view of a beam attenuator according to an alternative embodiment of the present invention.

FIG. 10-B shows a transverse view of the beam attenuator of FIG. 10-A.

DETAILED DESCRIPTION

In the following description, the term "longitudinal" is understood to refer to the direction of the light beam at the beam attenuator location. The term "transverse" is understood to refer a direction transverse to the longitudinal light beam direction. A "distal tip" at an end of a narrowing beam attenuator is understood to be at the narrower end of the beam attenuator. A light-blocking surface is understood to be a surface that does not permit the passage of light therethrough, such as a reflective or absorbing surface. A "concave quasi-cone" is understood to be a shape which, in transverse cross-section, is bounded by two concave, inwardly-curving boundaries terminating in a distal tip and symmetric with respect to a transverse central axis. Unless otherwise explicitly specified, any recited element may be formed monolithically from a single piece, assembled from multiple monolithic pieces, or be part of a larger monolithic piece. For example, a beam attenuator can be formed by a monolithic piece, an assembly, or part of a larger monolithic piece.

The following description illustrates embodiments of the invention by way of example and not necessarily by way of limitation.

Figure 1:
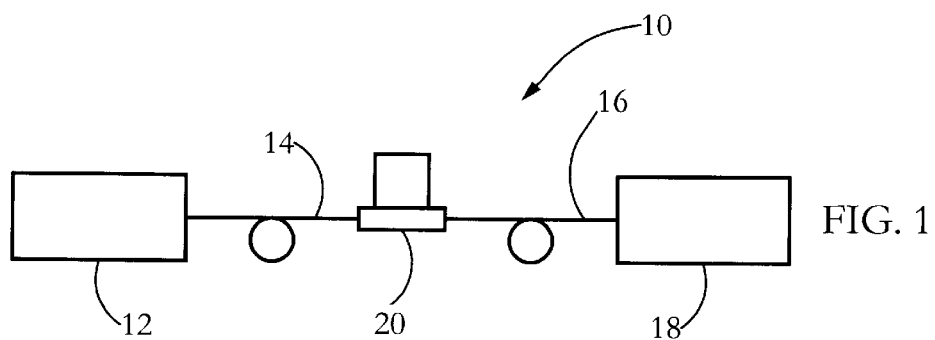
FIG. 1 is a schematic diagram of an optical system including a variable optical attenuator of the present invention.

FIG. 1 shows a schematic diagram of an optical system 10 including a variable optical attenuator 20 of the present invention. Optical system 10 can be for example an optical communications system. Optical system 10 includes an optical source 12 and an optical receiver 18 in optical communication with optical attenuator 20 over corresponding input and output optical links such as optical fibers 14, 16, respectively. Source 12 directs a light beam through input fiber 14 to optical attenuator 20, and receiver 18 receives the light beam after passage through optical attenuator 20 and output fiber 16.

Figure 2:
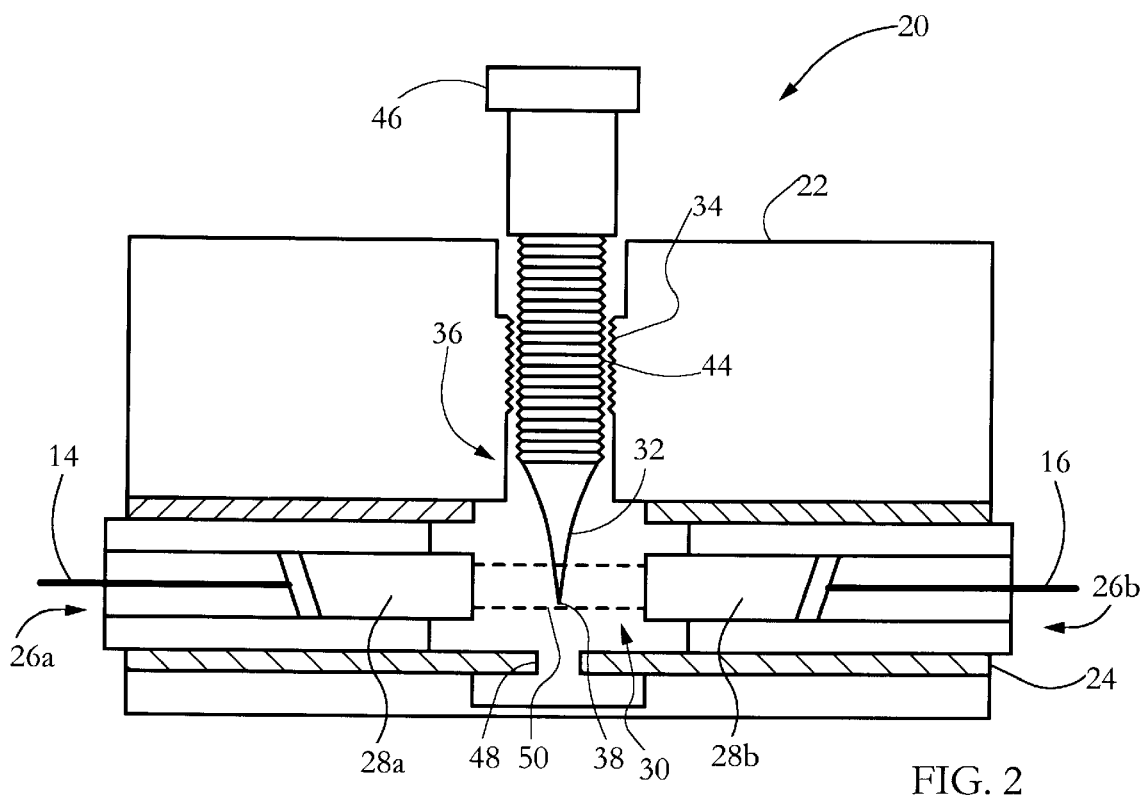
FIG. 2 schematically illustrates a longitudinal sectional view of a variable optical attenuator according to the presently preferred embodiment of the present invention.

FIG. 2 shows a longitudinal sectional view through optical attenuator 20, according to the preferred embodiment of the present invention. Optical attenuator 20 includes an external housing 22 enclosing the internal components of optical attenuator 20. A longitudinal cylindrical tube 24 is mounted and extends though housing 22. Conventional input and output optical fiber collimators 26a–b are mounted at opposite longitudinal ends of tube 24. Collimators 26a–b are maintained by cylindrical tube 24 in a co-linearly aligned position. Tube 24 maintains the alignment of collimators 26a–b in the presence of temperature variations.

Input collimator 26a is connected to input fiber 14, and transmits light received from input fiber 14 toward output collimator 26b. The light extending from input collimator 26a to output collimator 26b is illustrated in FIG. 2 as a light beam 50. Output collimator 26b is connected to output fiber 16, and directs light beam 50 into output fiber 16. As is apparent to the skilled artisan, input and output collimators 26a–b include conventional input and output lenses 28a–b, respectively. Lenses 28a–b can be GRIN or C-lenses.

An attenuation chamber 30 is defined by the longitudinal spacing between collimators 26a–b. Chamber 30 is capable of receiving a generally transverse beam attenuator 32, for variably attenuating light beam 50. Beam attenuator 32 has a proximal end 36, a distal tip 38, and a concave, curved beam-blocking surface extending between proximal end 36 and distal tip 38. Beam attenuator 32 is preferably shaped as a concave quasi-cone, as described in more detail below.

Beam attenuator 32 is rigidly connected at proximal end 36 to an elongated, transverse guiding member 44. Guiding member 44 is mounted through a transverse guide (guiding aperture) 34 defined in housing 22. Guiding member 44 includes a helical thread which mates with a corresponding complementary helical thread defined along guide 34, such that rotating guiding member 44 within guide 34 causes beam attenuator 32 to move along a linear transverse trajectory perpendicular to light beam 50. An external coupling part 46 is rigidly connected to guiding member 44 opposite beam attenuator 32. External coupling part 46 can include a manual control interface such as a handle or knob for allowing a user to manually rotate guiding member 44. External coupling part 46 can also include a connection to an external driving device such as a motor, for automatically driving the motion of beam attenuator 32. Guiding member 44, coupling part 46, and guide 34 serve as a control device coupled to beam attenuator 32, for controlling the transverse motion of beam attenuator 32 so as to vary the attenuation imparted by beam attenuator 32 to light beam 50. Generally, a control device for controlling the motion of beam attenuator 32 can include a driving device such as a motor coupled to beam attenuator 32, for automatically driving and controlling the motion of beam attenuator 32.

Beam attenuator 32, guiding member 44, and coupling part 46 can form a single monolithic piece, or can be distinct pieces or assemblies. In a present implementation, beam attenuator 32, guiding member 44, and coupling part 46 are formed from a monolithic stainless steel piece of a 3 mm diameter. Housing 22 can be made of gold-plated brass or other known materials.

To make optical attenuator 20, collimators 26a–b are mounted within cylindrical tube 24. Collimators 26a–b are co-linearly aligned in order to minimize the insertion loss of optical attenuator 20, and are then soldered in place. The assembly formed by cylindrical tube 24 and collimators 26a–b is then mounted in a longitudinal aperture of housing 22. The piece including beam attenuator 32, guiding member 44, and coupling part 46 is then screwed into guide 34. A high-vacuum grease is applied around the thread of guiding member 44, in order to prevent moisture from getting into chamber 30, and in order to provide lubrication between guiding member 44 and guide 34. Such lubrication facilitates the smooth linear motion of beam attenuator 32, without deviations from the axis of beam attenuator 32. Deviations from the linear trajectory of beam attenuator 32 can lead to changes in the attenuation imparted by beam attenuator 32. Cylindrical tube 24 is then epoxied to housing 22.

To operate optical attenuator 20, a user manually or automatically causes guiding member 44 to rotate within guide 34. Beam attenuator 32 then moves linearly along its transverse trajectory. The transverse position of beam attenuator 32 determines the extent to which beam attenuator 32 obstructs the passage of light beam 50 from input collimator 26a to output collimator 26b. The range of motion, length, width, and curvature of beam attenuator 32 are chosen to achieve desired attenuation characteristics as a function of transverse position, as described in more detail below.

Figure 3:
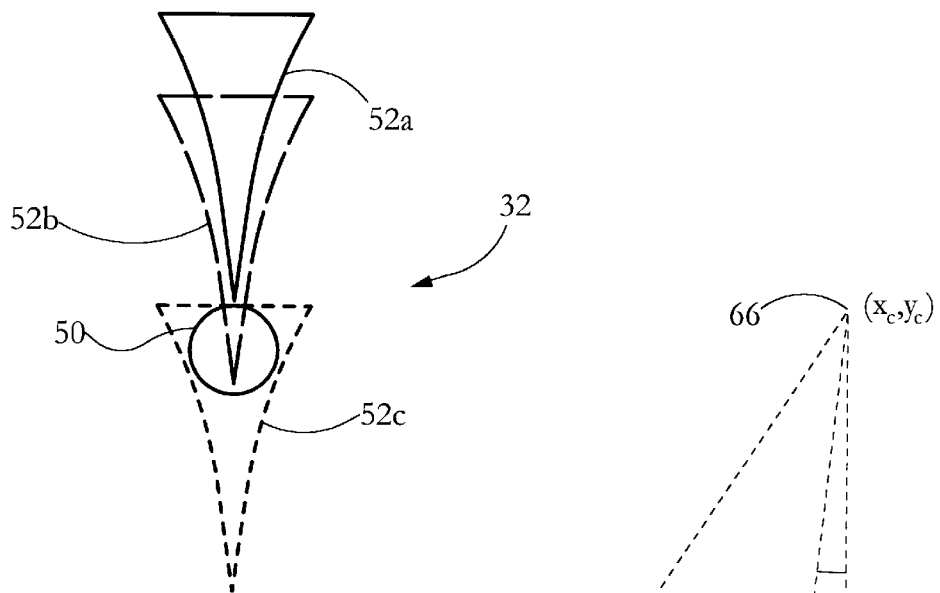
FIG. 3 shows a transverse view of a beam attenuator in three positions relative to a light beam, according to the present invention.

FIG. 3 shows a schematic transverse sectional view through light beam 50 and beam attenuator 32, for three sequential positions 52a–c of beam attenuator 32. Beam attenuator 32 can be moved continuously between the illustrated position. In a first position illustrated as 52a, beam attenuator 32 does not substantially obstruct light beam 50. As beam attenuator 32 is moved transversely (downward in FIG. 3), it starts blocking light beam 50 to an extent determined by the transverse position of beam attenuator 32. In a second, intermediate position 52b, beam attenuator 32 partially obstructs the passage of light beam 50. Finally, in a third position 52c, beam attenuator 32 allows substantially no light to pass through.

Figure 4:
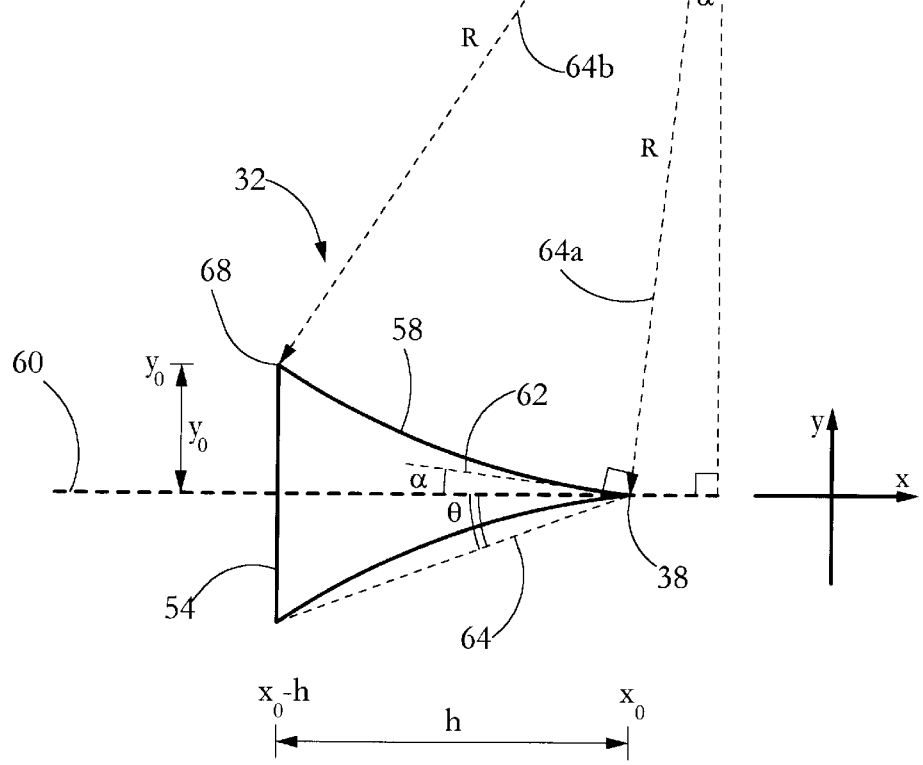
FIG. 4 shows a sectional view of a beam attenuator according to the presently preferred embodiment of the present invention.

FIG. 4 shows a transverse sectional view of beam attenuator 32 according to the preferred embodiment of the present invention. The direction of light propagation (z-axis) is perpendicular to the plane of FIG. 4. The two axes in the plane of FIG. 4 are labeled the x- and y-axes. The x-axis denotes the transverse direction of motion of beam attenuator 32. Beam attenuator 32 has a concave, quasi-conical shape. Along the x-direction, beam attenuator 32 extends between a generally longitudinal base 54 at $x=x_0-h$ and a sharp tip 38 at $x=x_0$. In the y-direction, beam attenuator 32 is bounded by an inwardly-curving function $y=y(x)$, with $y(x_0)=0$ and $y(x_0-h)=y_0$. The boundary defined by the function $y=y(x)$ terminates at distal tip 38. The radius $y_0$ of beam attenuator 32 at base 54 is preferably at least as large as the radius of light beam 50 at the longitudinal location of beam attenuator 32. Distal tip 38 is much narrower than the radius of light beam 50. The function $y=y(x)$ characterizes a rotationally-symmetric light-blocking surface 58 extending transversely from base 54. Blocking surface 58 is symmetric about a central axis 60 parallel to the x-axis.

A tip angle $\alpha$ is defined between central axis 60 and a tangent 62 to blocking surface 58 at tip 38 ($x=x_0$). A cone envelope angle $\theta$ is defined between central axis 60 and a conical envelope 62 extending linearly between the edge of base 54 and tip 38. The envelope angle $\theta$ is larger than the tip angle $\alpha$, and conical envelope 62 laterally encloses blocking surface 58. The tip angle $\alpha$ affects both the resolution and the back-reflection properties of blocking surface 58. A sharper tip angle $\alpha$ allows better attenuation resolutions. At the same time, reducing the tip angle $\alpha$ too much can lead to undesirable back reflections if blocking surface 58 is reflective. If blocking surface 58 is reflective, the tip angle $\alpha$ is preferably larger than or equal to about $8°$, in order to prevent back-reflections from blocking surface 58. If blocking surface 58 is made of a light absorbing or opaque material, the tip angle $\alpha$ can be less than $8°$. In one implementation the tip angle $\alpha$ was chosen to be equal to about 8°. In another implementation the tip angle α was chosen to be equal to about 30°.

In the presently preferred embodiment illustrated in FIG. 4, the x-y cross-section of blocking surface 58 is formed by two arcs of a circle disposed symmetrically with respect to central axis 60. Each arc has a radius of length R, as illustrated in FIG. 4 by the radii 64a–b. As shown, the angle formed between radius 64a (corresponding to tip 38) and the normal to central axis 60 passing through the arc center is equal to the tip angle α. The coordinates $(x_c, y_c)$ of the arc center 66 are given by $$x_c = x_0 + R \sin \alpha, y_c = R \cos \alpha. \quad [1a]$$

Any point on blocking surface 58 must satisfy the equation $$(x-x_c)^2 + (y-y_c)^2 = R^2. \quad [1b]$$

Applying eqs. [1a] and [1b] to a surface base point 68 of coordinates $(x_0-h, y_0)$ yields $$R = \frac{y_0^2 + h^2}{2y_0 \cos\alpha - 2h\sin\alpha}. \quad [1c]$$

Equation [1c] allows determining a suitable radius R for desired values of $y_0$, θ, and α. For example, for θ=15°, $y_0$=1.5 mm, and α=8°, eq. [1c] yields R=23.8 mm.

Using the locally-spherical curvature showed in FIG. 4 for blocking surface 58 allows relatively convenient machining of spherical surface 58 on a numerically computer-controlled (CNC) machine. In alternative embodiments, blocking surface 58 may have a parabolic, hyperbolic, or other concavely curved transverse cross-section.

The angle formed between blocking surface 58 and central axis 60 varies continuously along blocking surface 58. The minimum angle is the tip angle α, while the maximum angle is at base 54 ($x=x_0-h$). Blocking surface 58 is preferably not perpendicular to the direction of light propagation at any point along blocking surface 58, in order to minimize back-reflections from blocking surface 58.

Consider now a single-mode light beam 50. The light intensity of such a beam is concentrated around its middle, and decays toward the edges. The normalized light intensity distribution of a single-mode light beam can be approximated by the Gaussian distribution $$I(x, y) = \frac{2}{\pi} \exp\left(-\frac{2(x^2 + y^2)}{w_0^2}\right) \quad [2]$$

where $w_0$ is the beam waist. The intensity distribution in eq. [2] is normalized to 1, i.e.

$$\int_{-\infty}^{\infty} \int_{-\infty}^{\infty} I(x, y) dx dy = 1 \quad [3]$$

For a beam attenuator 32 with a cross-section characterized by the function y=y(x) for x between $x_0$ and $x_0-h$, and $y=y_0$ for $x<x_0-h$ (see FIG. 4), the blocked power as a function of total beam power is given by $$P_{block}(x_0) = 2\int_{-\infty}^{x_0-h} dx \int_0^{y_0} I(x, y) dy + 2\int_{x_0-h}^{x_0} dx \int_0^{y(x)} I(x, y) dy. \quad [4]$$

Substituting eq. [2] into eq. [4] yields $$P_{block}(x_0) = \quad [5]$$
$$2\int_{x_0-h}^{x_0} I(x) errf[y(x)] dx + 2 errf(x_0-h) errf(y_0) - errf(x_0).$$

where I(x) is the normalized one-dimensional intensity distribution $$I(x) = \sqrt{\frac{2}{\pi}} \exp\left(-\frac{2x^2}{w_0^2}\right), \quad [6]$$

and errf(x) is the error function $$errf(x) = \int_{-\infty}^{x} I(\xi) d\xi. \quad [7]$$

The attenuation Γ, expressed in dB, can be written as a function of $x_0$ as $$\Gamma = -10 \log_{10}[1-P_{block}(x_0)](dB). \quad [8]$$

Figure 5:
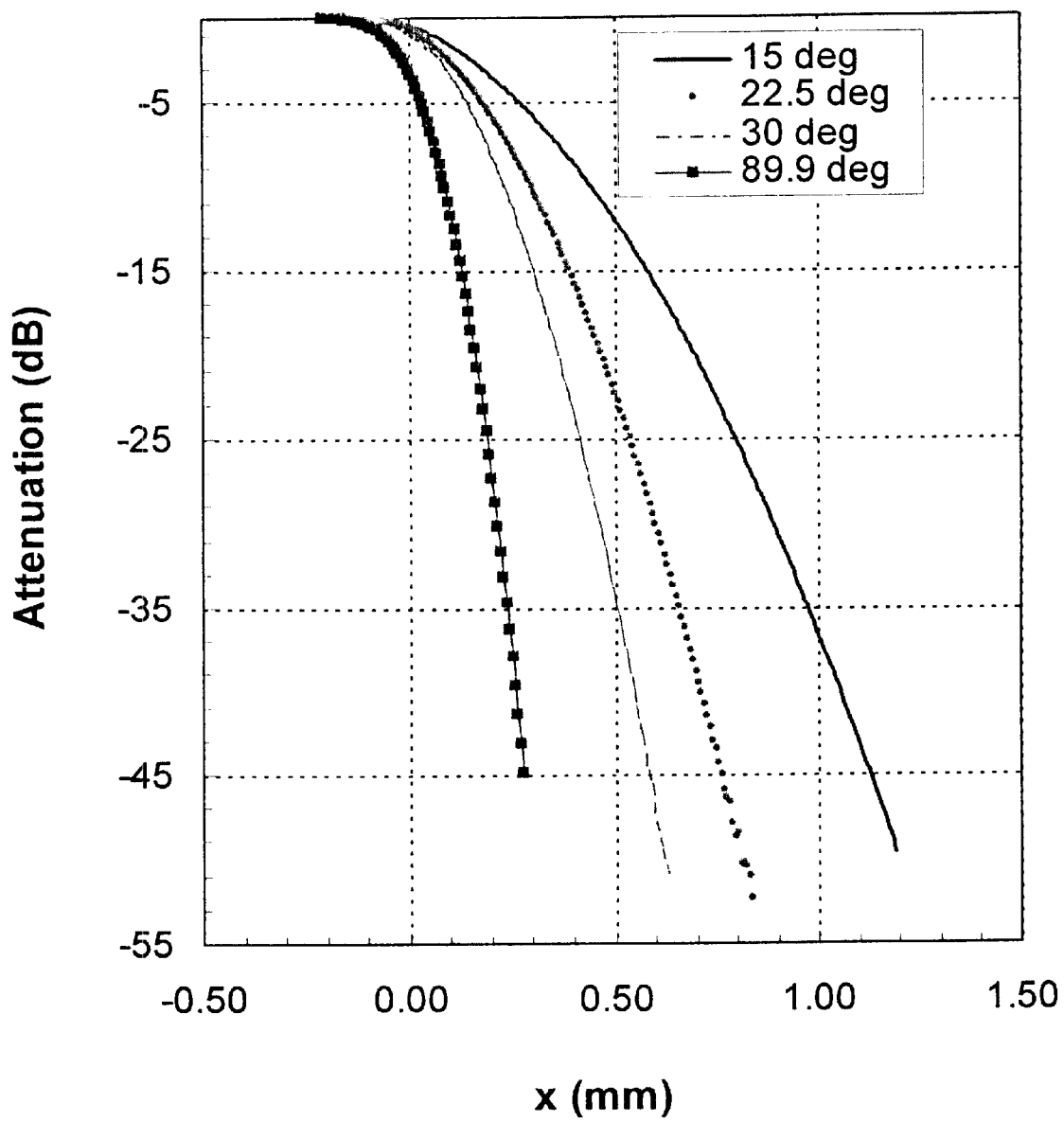
FIG. 5 is a graph of attenuation as a function of beam attenuator position for cone-shaped attenuators of various tip angles, for a single-mode Gaussian light beam.

For a conical beam attenuator shaped as the conical envelope 62 illustrated in FIG. 4, the surface function is $y(x)=(x_0-x)\tan\theta$. The power attenuation can be numerically calculated as function of tip position $x_0$ using the equations above. FIG. 5 shows graphs of numerically calculated attenuations as functions of beam attenuator position for a beam attenuator having a cone attached to a cylinder at the proximal end, for a cylinder/cone diameter $2y_0$=3 mm and a beam waist $w_0$=0.14 mm, and for half-cone angles θ=15°, 22.5°, 30°, 89.9°. As the half-cone angle θ increases, the slope becomes steeper and the resolution decreases. Table 1 lists the resulting slopes at the −10 dB attenuation point:

TABLE 1

| θ | 15° | 22.5° | 30° | 89.9° |
|---|---|---|---|---|
| Slope @ −10 dB | −33.1 dB/mm | −49.0 dB/mm | −63.9 dB/mm | −108.9 dB/mm |

The resolution of the optical attenuator, defined as the change in intensity corresponding to the minimal adjustment, is equal to the slope multiplied by the minimal transverse linear movement Δx. For a fixed Δx, the resolution is proportional to the slope. As Table 1 illustrates, a sharper angle θ allows higher resolutions. For example, the resolution for θ=15° is improved by a factor of 3.3 compared to the resolution for θ=89.9°. An angle θ=89.9° corresponds essentially to a flat (square) beam attenuator. At the same time, a sharper angle θ also requires a longer conical beam attenuator ($h=y_0/\tan\theta$ increases as θ decreases). For example, a cone with a half-angle θ=8° is about twice as long as a cone of the same radius but with a half-angle θ=15°.

Figure 6:
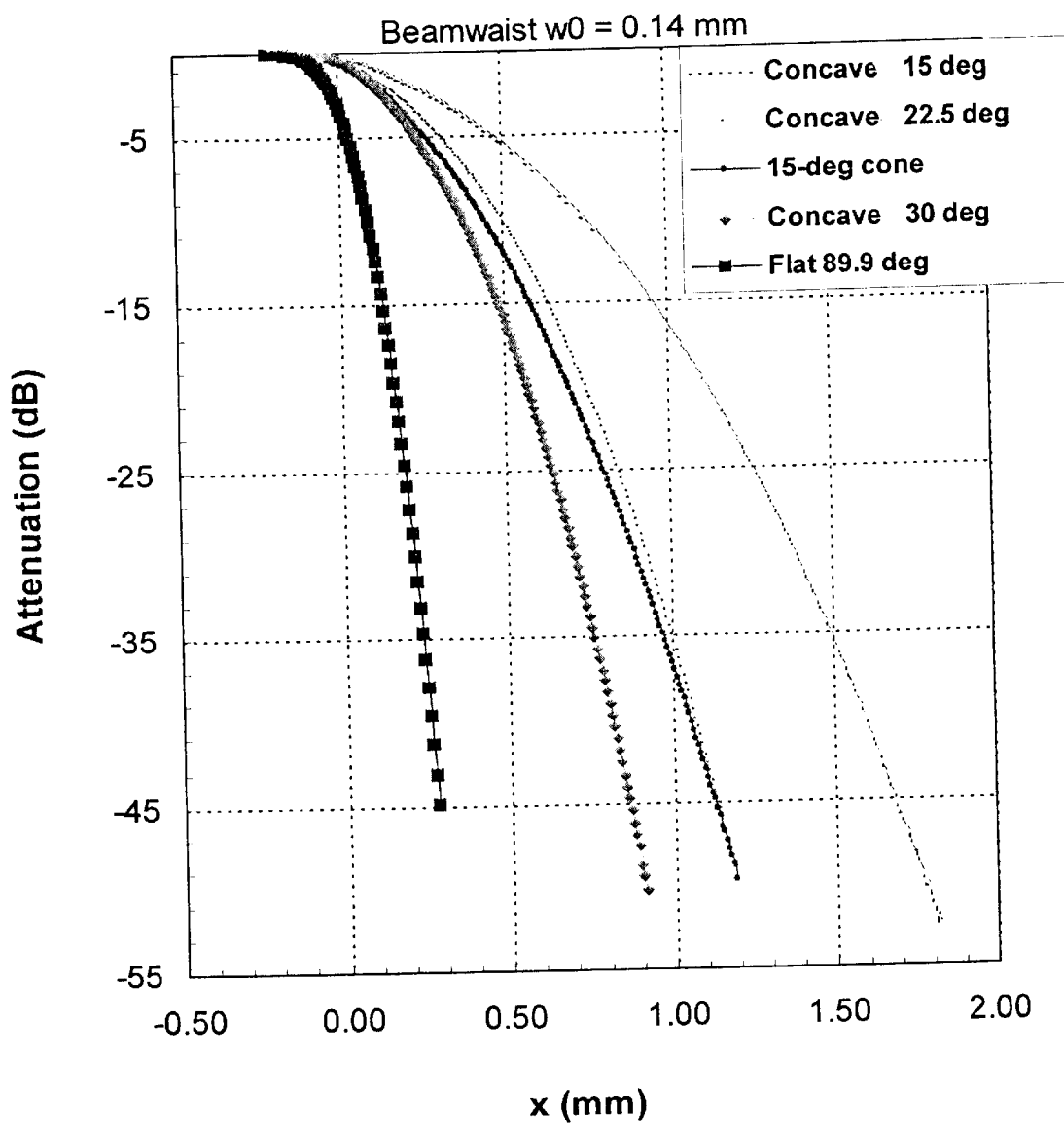
FIG. 6 is a graph of attenuation as a function of beam attenuator position for concave quasi-cone attenuators of various tip angles, for a single-mode Gaussian light beam, according to the present invention.

For a given beam attenuator size, using a concave, quasi-cone beam attenuator such as beam attenuator 32 (shown in FIG. 4) allows significant improvements in resolution relative to a cone-shaped attenuator of similar overall size. FIG. 6 shows numerically-calculated attenuations as functions of tip positions for a concave quasi-cone beam attenuator 32, for $2y_0$=3 mm, $w_0$=0.14 mm, and for angle pairs (θ,α)=(15°, 8°) (22.5°,12°), and (30°,16°). For comparison, FIG. 6 further shows data for a flat (square) beam block and for a θ=15° cone shaped as envelope 62. Table 2 lists the computed slopes at the point corresponding to −10 dB attenuation for the concave quasi-cones and the θ=15° cone corresponding to FIG. 6:

TABLE 2

| θ | 15° | 22.5° | 30° | 15° |
|---|---|---|---|---|
| α | 8° | 12° | 16° | 15° (cone) |
| Slope @ −10 dB | −21.7 dB/mm | −32.2 dB/mm | −42.3 dB/mm | −33.1 dB/mm |

Table 2 illustrates that a beam attenuator shaped as a concave quasi-cone according to the present invention allows an improved resolution, relative to a cone-shaped attenuator of the same external dimensions. For example, the resolution shown in Table 2 for the (θ,α)=(15°,8°) concave quasi-cone is improved by a factor of 1.5 relative to the corresponding resolution for a θ=15° cone having the same radius and length.

Figure 7:
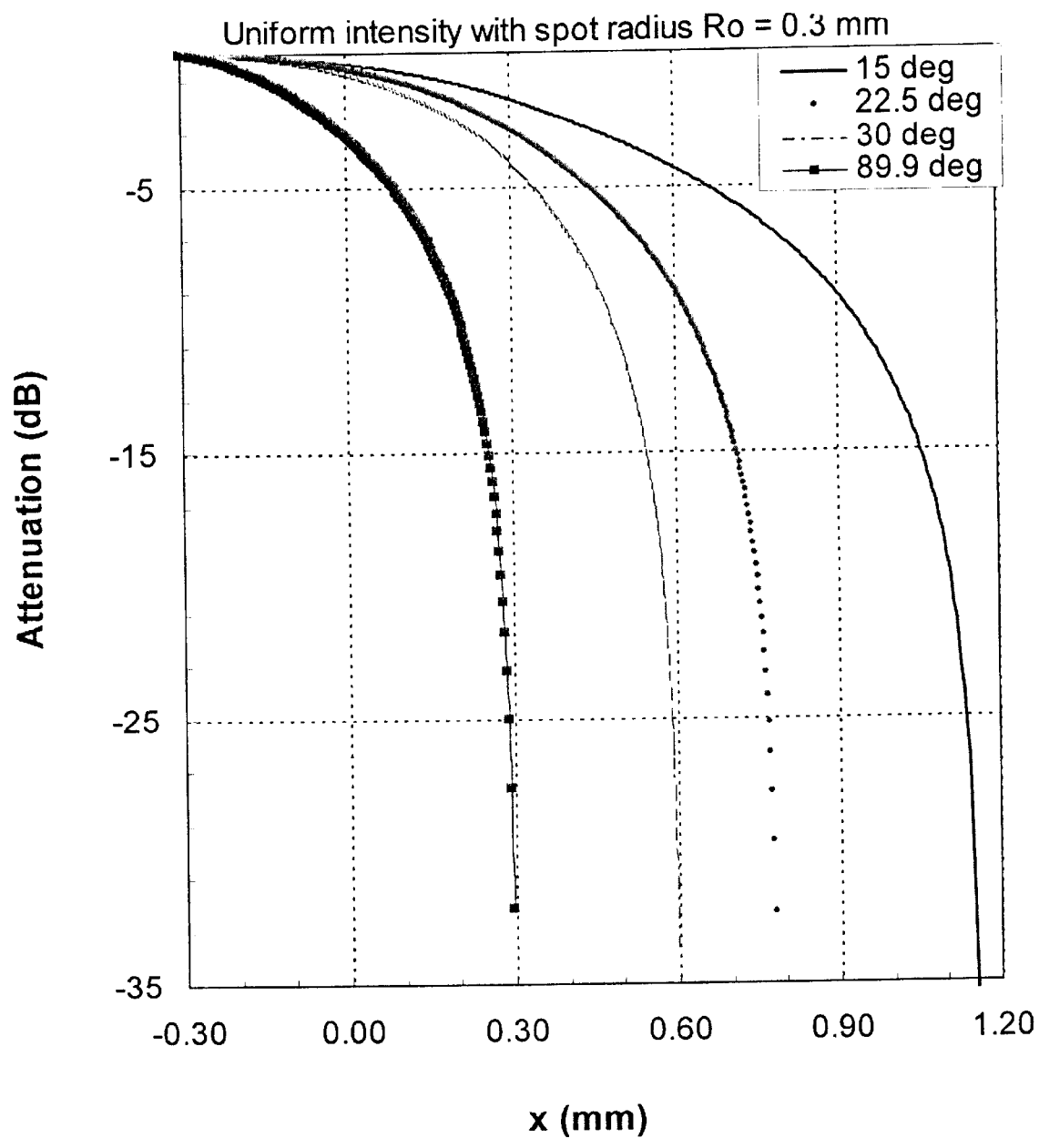
FIG. 7 is a graph of attenuation as a function of beam attenuator position for cone-shaped attenuators of various tip angles, for a multi-mode light beam.

Concave quasi-cone shaped beam attenuators of the present invention also allow improved resolutions for multi-mode light beams. Multi-mode light beam have multiple spots of high intensity. When directed into free space, the multi-mode spots may spread out. For simplicity, a multi-mode intensity distribution can be approximated as a uniform light intensity distribution within a certain beam radius $R_0$. FIG. 7 shows graphs of numerically calculated attenuation as functions of beam attenuator position for a beam attenuator having a cone attached to a cylinder at the proximal end, for a cylinder/cone diameter $2y_0$=3 mm and a multi-mode beam spot radius $R_0$=0.3 mm, and for half-cone angles θ=15°, 22.5°, 30°, 89.9°. Table 3 lists the resulting slopes at the −10 dB attenuation point:

TABLE 3

| θ | 15° | 22.5° | 30° | 89.9° |
|---|---|---|---|---|
| Slope @ −10 dB | −28.3 dB/mm | −41.8 dB/mm | −54.6 dB/mm | −67.0 dB/mm |

Figure 8:
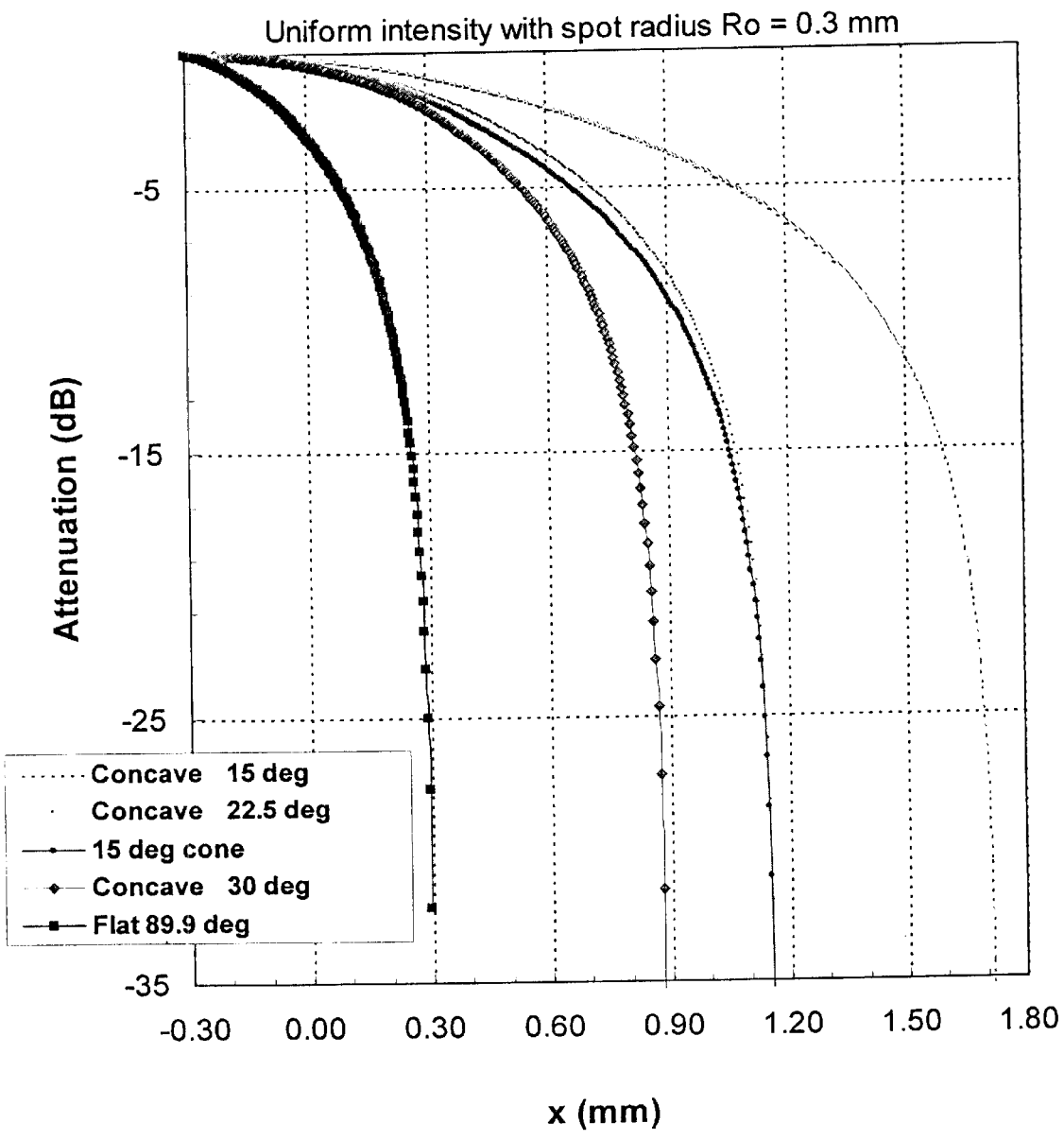
FIG. 8 is a graph of attenuation as a function of beam attenuator position for concave quasi-cone attenuators of various tip angles, for a multi-mode light beam, according to the present invention.

FIG. 8 shows numerically-calculated multi-mode beam attenuations as functions of tip positions for a concave quasi-cone beam attenuator 32, for $2y_0$=3 mm, $R_0$=0.3 mm, and for angle pairs (θ,α)=(15°,8°) (22.5°,12°), and (30°, 16°). For comparison, FIG. 8 further shows data for a flat (square) beam block and for a θ=15° cone shaped as envelope 62. Table 4 lists the computed slopes at the point corresponding to −10 dB attenuation for the concave-quasi cones and the θ=15° cone corresponding to FIG. 8.

TABLE 4

| θ | 15° | 22.5° | 30° | 15° |
|---|---|---|---|---|
| α | 8° | 12° | 16° | 15° (cone) |
| Slope @ −10 dB | −21.5 dB/mm | −31.5 dB/mm | −40.9 dB/mm | −28.3 dB/mm |

The resolution shown in Table 4 for the (θ,α)=(15°,8°) concave quasi-cone is improved by a factor of 1.3 relative to the corresponding resolution for a θ=15° cone having the same radius and length.

FIG. 9 shows part of an optical attenuator 120 according to an alternative embodiment of the present invention. Attenuator 120 includes an O-ring 135 positioned between a guiding member 144 and a corresponding guide 134. The O-ring provides an improved seal preventing contamination of the internal components of optical attenuator 120.

FIG. 10-A shows a central longitudinal sectional view of a beam attenuator 232 according to another alternative embodiment of the present invention. FIG. 10-B shows a generally transverse perspective view of beam attenuator 232. Beam attenuator 232 has a curved front side 233a facing the light beam, and a flat back side 233b facing away from the light beam. Beam attenuator 232 comprises a first concave quasi-cone blocking surface 358a, and a second, cylinder shaped blocking surface 358b contiguous to blocking surface 358a at the proximal end of blocking surface 358a. Blocking surface 358a can be made by taking the rotationally-symmetric shape of attenuator 32 (see FIGS. 2–4) and cutting away the back half and a front triangle-shaped portion. As shown in FIG. 10-B, blocking surface 358a has the same transverse cross-section as attenuator 32 (see FIGS. 2–4). The transverse cross-section of blocking surface 358a is bounded by two concave curves intersecting at a tip 238. As shown in FIG. 10-A, the central longitudinal cross-section of blocking surface 358a is bounded by two straight lines intersecting at tip 238.

Beam attenuator 232 can be inserted into the light beam by a linear transverse motion, without rotation about the central axis of beam attenuator 232. Beam attenuator 232 can also be inserted into the light beam by a rotational motion about a transverse axis perpendicular to the direction of the light beam and to the central axis of beam attenuator 232.

It will be clear to one skilled in the art that the above embodiments may be altered in many ways without departing from the scope of the invention. For example, various materials, optical components, and driving devices can be used in conjunction with the described beam attenuators. Suitable beam attenuators and associated control device components can be formed by monolithic structures or by assemblies of multiple distinct subcomponents. Moving of the beam attenuator relative to the light beam can be achieved by controlling the motion of the optics directing the light beam, e.g. by moving input and output collimators in tandem. A control device moving the optics is then still coupled to the beam attenuator, albeit indirectly. Moreover, the beam attenuator can be swung into the path of the light beam by rotation about an axis perpendicular to the direction of the light beam. Other three-dimensional beam attenuator shapes than those described above can be used to produce the beam-blocking cross-sections described above. The mathematical calculations presented are for illustrative purposes only, and are not intended to limit the invention. Various well-known motors can be used to drive and control the motion of the beam attenuator. Accordingly, the scope of the invention should be determined by the following claims and their legal equivalents.

What is claimed is:

1. A variable optical attenuator for attenuating a longitudinal light beam, comprising:

a) a generally transverse beam attenuator for attenuating the light beam, the beam attenuator including a proximal end, a distal tip, and a concave curved light-blocking surface extending between the proximal end and the distal tip, the blocking surface narrowing from the proximal region to the distal tip; and b) a control device coupled to the beam attenuator, for controlling a motion of the beam attenuator so as to vary an attenuation of the light beam caused by the beam attenuator, whereby the optical attenuator has a variable resolution depending on an extent of the blocking surface blocking the light beam.

2. The optical attenuator of claim 1 wherein the control device comprises:

a) a guiding member attached to beam attenuator; and b) a guide laterally abutting the guiding member, for constraining the beam attenuator to move along a linear trajectory perpendicular to a direction of the light beam.

3. The optical attenuator of claim 2, wherein the guiding member has a first thread, and the guide has a second thread mating the first thread such that rotating the guiding member within the guide causes the beam attenuator to move along the linear transverse trajectory.

4. The optical attenuator of claim 2, further comprising an O-ring positioned between the guiding member and the guide, for isolating the beam attenuator from an external environment of the beam attenuator.

5. The optical attenuator of claim 1 wherein the control device comprises a manual control interface coupled to the beam attenuator, for manually controlling the motion of the beam attenuator.

6. The optical attenuator of claim 1 wherein the control device comprises a driving device coupled to the beam attenuator, for driving the motion of the beam attenuator.

7. The optical attenuator of claim 1 wherein the beam attenuator has a tip angle defined between a central axis of the beam attenuator and a surface of the beam attenuator at the distal tip, the tip angle being larger than or equal to 8 degrees.

8. The optical attenuator of claim 1 wherein a transverse cross-section through the beam attenuator has a boundary shaped substantially as two arcs of a circle symmetrically disposed with respect to a transverse central axis of the beam attenuator.

9. The optical attenuator of claim 1 wherein the beam attenuator is rotationally symmetric with respect to a transverse central axis of the beam attenuator.

10. The optical attenuator of claim 1 wherein the blocking surface is substantially reflective.

11. The optical attenuator of claim 1 further comprising a first collimator and a second collimator positioned on opposite sides of the beam attenuator, for directing the light beam.

12. A variable optical attenuator for attenuating a longitudinal light beam, comprising:

a) a generally transverse beam attenuating member for attenuating the light beam, the attenuating member having a proximal end, a distal tip, and a concave curved blocking surface extending between the proximal end and the distal tip, the blocking surface narrowing from the proximal end toward the distal tip, the blocking surface being rotationally symmetric with respect to a transverse central axis of the beam attenuator; and b) a generally transverse guide coupled to the attenuating member, for controlling a transverse motion of the attenuating member so as to vary an attenuation of the light beam caused by the attenuating member, whereby the optical attenuator has a variable resolution depending on an extent of the blocking surface blocking the light beam.

13. A variable optical attenuator for attenuating a longitudinal light beam, comprising a generally transverse beam attenuator having a distal tip, a transverse cross-section of the beam attenuator being bounded by two inwardly curving boundaries terminating at the distal tip.

14. A variable optical attenuator for attenuating a longitudinal light beam, comprising a generally transverse beam-attenuating member for attenuating the light beam, the attenuating member having a blocking surface shaped as a concave quasi-cone terminating in a distal tip.

15. A method of variably attenuating a longitudinal light beam, comprising the steps of:

a) directing the light beam onto a generally transverse beam-attenuating member for attenuating the light beam, the attenuating member including a proximal region and a concave curved blocking region having a distal tip, the blocking region extending between the proximal region and the distal tip, the blocking region narrowing from the proximal region toward the distal tip; and b) transversely moving the attenuating member for varying an extent of the concave blocking region blocking the light beam, thus varying an attenuation of the light beam caused by the attenuating member.

16. An optical system comprising:

a) an optical source for generating a light beam;

b) a variable optical attenuator optically connected to the light source, for receiving and variably attenuating the light beam, comprising:

a generally transverse beam attenuator for attenuating the light beam, the attenuator including a proximal region and a concave curved blocking region having a distal tip, the blocking region extending between the proximal region and the distal tip, the blocking region narrowing from the proximal region toward the distal tip; and a control device coupled to the beam attenuator, for controlling a motion of the beam attenuator so as to vary an attenuation of the light beam caused by the beam attenuator, whereby the attenuator has a variable resolution depending on an extent of the concave blocking region blocking the light beam; and c) an optical receiver optically connected to the variable optical attenuator, for receiving the light beam after passage through the variable optical attenuator.

* * * * *